UNITED STATES PATENT OFFICE.

ERIC HJALMAR WESTLING, OF ANTIOCH, CALIFORNIA.

PROCESS OF OBTAINING MANGANESE PEROXID.

1,325,129.   Specification of Letters Patent.   Patented Dec. 16, 1919.

No Drawing.   Application filed March 14, 1918. Serial No. 222,378.

*To all whom it may concern:*

Be it known that I, ERIC HJALMAR WESTLING, a citizen of the United States, and resident of Antioch, county of Contra Costa, State of California, have invented a certain new and useful Process of Obtaining Manganese Peroxid, of which the following is a specification.

The invention relates more specifically to a process of separating manganese peroxid from impure manganese ores and compounds.

An object of the invention is to provide a process for producing substantially pure manganese peroxid.

Another object of the invention is to provide a process for separating manganese peroxid from manganous sulfate solutions.

The invention possesses other advantageous features, some of which, with the foregoing, will be set forth at length in the following description, where I shall outline in full the preferred method of carrying out the process of my invention.

Almost all commercially important manganese ores contain manganic oxid, or peroxid of manganese or compounds of oxids containing more oxygen than would correspond to divalent manganese, together with silica and other substances, and the object of this process is to obtain substantially pure manganese peroxid from the ore. In accordance with my process, the pulverized manganese ore is introduced into a closed tower with water or a mixture of manganese sulfate and dithionate solution, there being sufficient water or solution employed so that the ore may be kept in suspension. Hot sulfur dioxid is introduced into the mixture in the tower, preferably at the bottom, so that it produces an agitating effect on the mixture. Upon the introduction of the sulfur dioxid, a series of reactions will take place, the final result being, in the case of $MnO_2$, a solution containing more than two-thirds of the manganese as sulfate and less than one-third as dithionate. When the ore contains $Mn_2O_3$, some sulfuric acid must be added to produce the desired result. The mixture of material in the tower is preferably heated, by a steam coil or other means, and by maintaining the temperature above 60° C. only about one-third or less of the manganese will form such dithionate as $MnS_2O_6$.

The attendant reactions are substantially as follows:

$$MnO_2 + SO_2 = MnSO_4$$
$$MnO_2 + 2SO_2 = MnS_2O_6$$
$$Mn_2O_3 + SO_2 + H_2SO_4 = 2MnSO_4 + H_2O$$
$$Mn_2O_3 + 2SO_2 + H_2SO_4 = MnSO_4 + MnS_2O_6 + H_2O$$

By keeping the liquid mixture hot, continuous decomposition of the manganese dithionate is accomplished, causing the production of manganese sulfate and sulfurous acid, which will act on another quantity of manganese ore.

Hot sulfurous acid gas from a suitable roaster, or retort, or other source of producing $SO_2$, either pure or mixed with the usual amount of nitrogen and other more or less inert gases, is introduced into a closed tower containing pulverized manganese ore, and either water or a mixture of manganese sulfate and dithionate solution. If the $SO_2$ is cold, a steam coil or other means may be employed to heat the liquid. If the gas is entered from the bottom, it will serve at the same time as an agitating agency. The gas which may still contain $SO_2$ after passing through the liquid in the tower is passed from the top of the first tower into the bottom of a second tower and from the second tower possibly into a third or more similar towers, all containing water or a solution of $SO_2$, sulfates, and dithionates, with manganese ore suspended. The result will be, that in the first tower where the temperature is the highest, mainly sulfates will be produced while in the other towers where the temperature is lower, comparatively more dithionates will be formed. The obvious procedure, therefore, would be to have a series of towers, with $SO_2$ gas going through, all containing manganese ore suspended; but the liquid used in the first tower to start in with would not be water, but a mixture of sulfates and dithionates produced in the other towers. An additional reaction due to the temperature in the first tower will, therefore, be as follows:

$$MnS_2O_6 + MnO_2 = 2MnSO_4$$

In the first tower I have a solution of sulfates and dithionates originally produced in the second tower. In the second tower a solution previously produced in the third tower is used, while water is employed in the third tower when only three towers are used. The hot gas from the sulfur or pyrites burners, or otherwise obtained, produces in the first tower mostly manganese sulfate. In the second tower, where the temperature is lower, a certain amount of dithionate is formed, and in the third tower the proportion of sulfate to dithionate is about as one to one.

After the $SO_2$ gas has been allowed to pass through the system a suitable length of time, it is advisable to drive preheated air through the system, until the sulfurous acid has been driven out of the first tower, and the iron salts incidentally produced from some of the iron existing in the ore as an impurity has been changed from ferrous to ferric. To destroy the small quantity of dithionates still possibly existing in the solution, as well as to finish the oxidation of the iron, a little nitric acid is then added to the first tower. When the air has been on a suitable time, and the solution contains nothing but sulfates, with iron in the ferric stage, the contents of the towers are discharged.

The contents of the first tower are settled out, or filtered, as the case may be, the silicious residue discarded, and the sulfate solution treated as hereinafter described.

The contents of the second tower are settled, or filtered, as the case may be, and the solution of a mixture of sulfate and dithionate pumped into the first tower for subsequent treatment with fresh manganese ore and hot sulfurous acid gas.

The contents of the third tower are settled and washed in a settling tank, the solution and wash water pumped into the second tower for subsequent treatment with fresh manganese ore and sulfurous acid gas. Duplicate first towers may be used, or duplicate sets of towers, one set being run through with $SO_2$ while the other set is treated with hot air.

The solution of manganous sulfate thus obtained will contain some iron as ferric sulfate and alumina as sulfate, as well as phosphoric acid, and other impurities, if such were contained in the ore. The solution is then treated with powdered limestone to precipitate ferric hydroxid and hydroxid of alumina if present, as well as phosphoric acid as ferric phosphate.

The next step consists in filtering the solution of manganese sulfate to remove the precipitates. This solution will now contain no impurities of the iron group, nor phosphorus, arsenic, etc. It will only contain manganese sulfate, and a little calcium sulfate.

The next step consists in adding calcium nitrate to the solution of manganese sulfate to produce by double decomposition on the one hand calcium sulfate which will precipitate, and on the other hand manganese nitrate which remains in solution, and is filtered off. The attendant reaction would then be expressed as follows:

$$MnSO_4 + Ca(NO_3)_2 = CaSO_4 + Mn(NO_3)_2$$

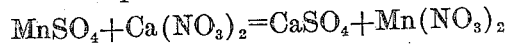

A small amount of calcium sulfate will necessarily remain in the solution, which ordinarily is of no importance. If the presence of small quantities of sulfates should be obnoxious in the product, I add a sufficient amount of barium or lead nitrate at this stage to thoroughly precipitate all sulfates. I then filter off the precipitate from the solution which now contains nothing but manganese nitrate with a small impurity of calcium nitrate.

The next step consists of boiling the manganese nitrate solution, when the following reaction takes place:

$$Mn(NO_3)_2 = MnO_2 + N_2O_4$$

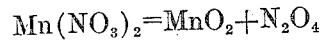

The nitric fumes are pumped through a series of absorption towers containing water, with addition of air, the oxygen of which, together with the nitric fumes and water, will form nitric acid, essentially according to the reactions $$N_2O_4 + H_2O = HNO_3 + HNO_2$$
$$2HNO_2 = N_2O_3 + H_2O$$
$$N_2O_3 + O = N_2O_4$$

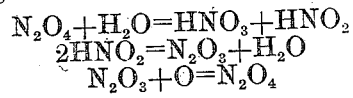

$N_2O_4$ will then again decompose. The total reactions may be summarized as the following:

$$N_2O_4 + H_2O + O = 2HNO_3$$

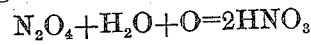

Nitric acid being often more valuable than calcium nitrate, it may be advisable to obtain it as a by-product, but if this extra profit is not desired, the next step consists in neutralizing the nitric acid with lime or limestone, again forming calcium nitrate, to use on a new batch of manganese sulfate solution.

I claim:

1. The process of obtaining manganese peroxid from ores containing the same or other manganese oxids, which includes subjecting a mixture of the ore and a liquid to hot sulfurous acid whereby a manganese sulfate solution is produced.

2. The process of obtaining manganese peroxid from ores containing the same or other manganese oxids, which includes subjecting a mixture of the ore and manganese sulfate and manganese dithionate solution to hot sulfurous acid, whereby the manganese oxids and the dithionate are converted into manganese sulfate.

3. The process of obtaining manganese peroxid from ores containing the same or other manganese oxids, which includes suspending the ground ore in a liquid and passing hot sulfurous acid gas through the liquid, whereby manganese sulfate is formed.

4. The process of obtaining manganese peroxid from ores containing the same or other manganese oxids, which includes suspending the ground ore in a hot liquid and passing sulfurous acid gas through the liquid, whereby manganese sulfate solution is formed.

5. The process of obtaining manganese peroxid from ores containing the same or other manganese oxids, which includes suspending the ground ore in a hot solution containing manganese dithionate and passing sulfurous acid gas through the solution whereby the oxid and the dithionate are converted into manganese sulfate.

6. The process of obtaining manganese peroxid from ores containing the same or other manganese oxids, which includes suspending the ground ore in a liquid, passing hot sulfurous acid gas into the liquid whereby manganese sulfate and manganese dithionate are formed, and heating the liquid to cause the dithionate to combine with the peroxid and produce manganese sulfate.

7. The process of obtaining manganese peroxid from ores containing the same or other manganese oxids, which includes subjecting the ground ore suspended in a liquid to sulfurous acid in the presence of heat whereby manganese sulfate and a small amount of manganese dithionate are formed, and passing preheated air through the liquid to drive out the sulfurous acid.

8. The process of obtaining manganese peroxid from ores containing the same or other manganese oxids, which includes subjecting the ground ore in suspension in a liquid to sulfurous acid in the presence of heat to produce a manganese sulfate solution, adding a nitrate to the solution to convert the manganese sulfate to manganese nitrate, and heating the nitrate solution to produce manganese peroxid and nitric acid fumes.

9. The process of obtaining manganese peroxid from ores containing the same or other manganese oxids, which includes converting the peroxid into a sulfate, converting the sulfate into a nitrate, and heating the nitrate to produce the peroxid.

10. The process of obtaining manganese peroxid from ores containing the same or other manganese oxids, which includes converting the peroxid into a sulfate solution, separating the solution from the solid portion of the mixture, treating the sulfate solution with a nitrate to produce manganese nitrate, and heating the nitrate solution to produce manganese peroxid.

11. The process of obtaining manganese peroxid from ores containing the same or other manganese oxids, which includes converting the peroxid into a sulfate solution, separating the solution from the solid portion of the mixture, treating the solution with lime stone to precipitate impurities therein, separating the precipitate from the solution, adding calcium nitrate to the solution to convert the manganese sulfate into manganese nitrate, and then boiling the nitrate solution to produce manganese peroxid.

In testimony whereof, I have hereunto set my hand at San Francisco, California, this 4th day of March 1918.

ERIC HJALMAR WESTLING.

In presence of—
H. G. PROST.